United States Patent
Zeng et al.

(10) Patent No.: US 12,260,653 B2
(45) Date of Patent: Mar. 25, 2025

(54) SAFETY BELT DETECTION METHOD, APPARATUS, COMPUTER DEVICE, AND STORAGE MEDIUM

(71) Applicant: Black Sesame Technologies Inc., San Jose, CA (US)

(72) Inventors: Yuqian Zeng, Shanghai (CN); Tao Zhang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 304 days.

(21) Appl. No.: 17/720,042

(22) Filed: Apr. 13, 2022

(65) Prior Publication Data
US 2023/0020385 A1    Jan. 19, 2023

(30) Foreign Application Priority Data

Jul. 19, 2021    (CN) .......................... 202110814893.3

(51) Int. Cl.
*G06V 20/59*    (2022.01)
*G06N 5/01*    (2023.01)
(Continued)

(52) U.S. Cl.
CPC ............. *G06V 20/593* (2022.01); *G06N 5/01* (2023.01); *G06T 7/11* (2017.01); *G06T 7/70* (2017.01);
(Continued)

(58) Field of Classification Search
CPC .... G06N 5/01; G06T 7/11; G06T 7/70; G06T 2207/20081; G06T 2207/20084;
(Continued)

(56) References Cited

U.S. PATENT DOCUMENTS

| | | | |
|---|---|---|---|
| 2014/0071169 A1 | 3/2014 | Chang | |
| 2014/0322676 A1* | 10/2014 | Raman | G09B 19/167 434/65 |

FOREIGN PATENT DOCUMENTS

| | | |
|---|---|---|
| CN | 110503831 A | 11/2019 |
| CN | 112070779 A | 3/2022 |
| CN | 111488930 A | 5/2024 |

OTHER PUBLICATIONS

Guo Shao-jun, Shen Tong-sheng, Xu Jian, Ma Xin-xing, Detection of multi-ship targets at sea based on ObjectNess Bing, Systems Engineering and Electronics, vol. 38, No. 1, Jan. 2016.
(Continued)

*Primary Examiner* — Diane D Mizrahi
(74) *Attorney, Agent, or Firm* — Timothy T. Wang; Ni, Wang & Massand, PLLC

(57) ABSTRACT

A safety belt detection method, apparatus, computer device and computer readable storage medium are disclosed. The safety belt detection method includes the steps as follows. An image to be detected is obtained. The image to be detected is inputted into a detection network which includes a global dichotomous branch network and a grid classification branch network. A dichotomous result, which indicates whether a driver is wearing a safety belt and is output from the global dichotomous branch network, is obtained. A grid classification diagram, which indicates a position information of the safety belt and is output from the grid classification branch network, is obtained based on image classification. A detection result of the safety belt, indicating whether the driver is wearing the safety belt normatively, is obtained based on the dichotomous result and the grid classification diagram.

15 Claims, 17 Drawing Sheets

(51) Int. Cl.
    *G06T 7/11*      (2017.01)
    *G06T 7/70*      (2017.01)
    *G06V 10/25*     (2022.01)
    *G06V 10/82*     (2022.01)
    *G06V 40/10*     (2022.01)
    *G06V 40/16*     (2022.01)

(52) U.S. Cl.
    CPC .............. *G06V 10/25* (2022.01); *G06V 10/82* (2022.01); *G06V 40/11* (2022.01); *G06V 40/162* (2022.01); G06T 2207/20081 (2013.01); G06T 2207/20084 (2013.01); G06T 2207/20132 (2013.01); G06T 2207/30201 (2013.01); G06T 2207/30268 (2013.01)

(58) Field of Classification Search
    CPC . G06T 2207/20132; G06T 2207/30201; G06T 2207/30268; G06V 10/25; G06V 10/82; G06V 40/11; G06V 40/162
    See application file for complete search history.

(56) References Cited

OTHER PUBLICATIONS

Yang Qing0xian, Wang Li-zhen, Zhuo Ru-liang, Application of clustering algorithm based on grids technology in remotely sensed data, Journal of Yunnan University, 2009.

* cited by examiner

SAFETY BELT DETECTION METHOD, APPARATUS, COMPUTER DEVICE, AND STORAGE MEDIUM

CROSS REFERENCE TO RELATED APPLICATION

This patent application claims the benefit and priority of Chinese Patent Application No. 202110814893.3 filed on Jul. 19, 2021, the disclosure of which is incorporated by reference herein in its entirety as part of the present application.

TECHNICAL FIELD

The disclosure relates to the technical field of image recognition, and more specifically, to a safety belt detection method, apparatus, computer device and storage medium.

BACKGROUND ART

Cameras are generally used in the Driver monitoring system (DMS) for monitoring the status of drivers. In some applications of DMS, it is necessary to judge whether the driver is wearing the safety belt properly. The DMS alarms to prevent the motor vehicle from colliding or causing injury in case of emergency braking in a case that the driver does not wear the safety belt in a standard way.

Generally, the image taken from the camera is classified, recognized or semantically segmented based on the method of deep learning, so as to detect the wearing of the safety belt from the captured image. However, the traditional detection methods have low detection accuracy, large amount of calculation, and it is difficult to obtain the detailed information of the safety belt, and it is difficult to judge whether the driver is wearing the safety belt correctly.

SUMMARY

In view of the above, the present disclosure provides a safety belt detection method, apparatus, computer device and storage medium.

A first aspect of the disclosure is to provide a safety belt detection method, including the steps as follows. An image to be detected is obtained. The image to be detected is inputted into a detection network which includes a global dichotomous branch network and a grid classification branch network. A dichotomous result, which indicates whether a driver wears a safety belt and is output from the global dichotomous branch network, is obtained. A grid classification diagram, which indicates a position information of the safety belt and is output from the grid classification branch network, is obtained based on image classification. A detection result of the safety belt, indicating whether the driver wears the safety belt normatively, is obtained based on the dichotomous result and the grid classification diagram.

In an embodiment, obtaining an image to be detected includes the steps as follows. An original image is captured by a camera. A face in the original image is detected based on a face detection algorithm to obtain a face bounding box and a head posture information. It is determined whether a part below the face in the original image meets a predetermined size. A detection result is determined as insufficient detection area if the predetermined size is not met. The part below the face in the original image is dynamically cropped based on the lace bounding box and the head posture information to obtain a cropped image if the predetermined size is met. The cropped image is pre-processed to obtain the image to be detected.

In an embodiment, after obtaining an original image through a camera, the safety belt detection method further includes the steps as follows. A human hand in the original image is detected based on a human band detection algorithm to obtain a human hand bounding box. A safety belt bounding box is obtained in the original image based on a position and a size of the face bounding box. The image is not cropped, and it is determined that the detection result is that the safety belt is covered when the hand bounding box is located at a predetermined position relative to the bounding box and an overlapping area of the hand bounding box and the safety belt bounding box is greater than a set threshold.

In an embodiment, obtaining a grid classification diagram output from the grid classification branch network based on image classification includes the steps as follows. The image to be detected is divided into multiple grids in row and column directions. It is judged whether the image in each grid of the row or column corresponds to a safety belt area row by row or column by column. The grid in which the image corresponds to the safety belt area is marked as a safety belt grid. And the grid classification diagram in which the safety belt grid is marked is obtained.

In an embodiment, the detection network further includes a backbone network. Before obtaining a dichotomous result output from the global dichotomous branch network and obtaining a grid classification diagram output from the rid classification branch network based on image classification, the method further includes the steps as follows. A convolution of the image to be detected is obtained by the backbone network to generate a feature map of the image to be detected and the feature map is used as an input of the global dichotomous branch network and the grid classification branch network.

In an embodiment, obtaining a detection result of the safety belt based on the dichotomous result and the grid classification diagram includes the steps as follows. Coordinates of the safety belt grids in the grid classification diagram are obtained. A centerline of the safely belt in the grid classification diagram is fitted based on the coordinates. Parameters related to the centerline are calculated. And the detection result of the safety belt is obtained based on the parameters and the dichotomous result.

In an embodiment, the parameters related to the centerline includes an included angle between the centerline and a predetermined direction, and a relative position between the centerline and the driver's shoulder.

In an embodiment, before obtaining the image to be detected, the method further includes the steps as follows. The training images are selected. And the global dichotomous branch network and the grid classification branch network are trained with an aid of an image segmentation branch network based on the training images. The image segmentation branch network outputs segmentation images based on the training images, the segmentation images are reduced by a predetermined proportion relative to the training images, and pixel positions of the segmentation images are mapped corresponding to pixel positions of the image to be detected.

A second aspect of the disclosure is to provide a safety belt detection apparatus, including the units as follows. An image obtaining unit is configured to obtain an image to be detected. An image detection unit is configured to inputting the image to be detected into a detection network. The detection network includes a global dichotomous branch network and a grid classification branch network. A dichotomous result output from the global dichotomous branch network is obtained and a grid classification diagram output from the grid classification branch network based on image classification is obtained. The dichotomous result indicates whether a driver wears a safety belt, and the grid classification diagram indicates a position information of the safety belt. And a result obtaining unit is configured to obtain a detection result of the safety belt based an the dichotomous result and the grid classification diagram. The detection result indicates whether the driver wears the safety belt normatively.

In an embodiment, the image obtaining unit includes: an image capture unit, configured to capture an original image by a camera; an image cropping unit configured to: detect a face in the original image based on a face detection algorithm to obtain a face bounding box and a head posture information, determine whether a part below the face in the original image meets a predetermined size, determine a detection result as insufficient detection area if the predetermined size is not met; or dynamically crop the part below the face in the original image based on the face bounding box and the head posture information to obtain a cropped image if the predetermined size is met; and an image pre-processing unit, configured to pre-process the cropped image to obtain the image to be detected.

In an embodiment, the image cropping unit is further configured to: detect a human hand in the original image based on a human hand detection algorithm to obtain a human hand bounding box; obtain a safety belt bounding box in the original image based on a position and a size of the face bounding box; and not crop the image and determine that the detection result is that the safety belt is covered when the hand bounding box is located at a predetermined position relative to the face bounding box and an overlapping area of the hand bounding box and the safety belt bounding box is greater than a set threshold.

In an embodiment, the image detection unit includes a grid classification branch network detection unit configured to: divide the image to be detected into a plurality of grids in row and column directions, judge whether the image in each grid of the row or column corresponds to a safety belt area row by row or column by column, mark the grid in which the image corresponds to the safety belt area as a safety belt grid, and obtain the grid classification diagram in which the safety belt grid is marked.

In an embodiment, the detection network further includes a backbone network. The image detection unit further includes a feature extraction unit, configured to obtain a convolution of the image to be detected by the backbone network to generate a feature map of the image to be detected, and use the feature map as an input of the global dichotomous branch network and the grid classification branch network.

In an embodiment, the result obtaining unit includes: a centerline calculation unit, configured to obtain coordinates of the safety belt grids in the grid classification diagram, fit a centerline of the safety belt in the grid classification diagram based on the coordinates, and calculate parameters related to the centerline. The result obtaining unit is further configured to obtain the detection result of the safety belt based on the parameters and the dichotomous result.

In an embodiment, the parameters related to the centerline includes: an included angle between the centerline and a predetermined direction, and a relative position between the centerline and the driver's shoulder.

In an embodiment, the safety belt detection apparatus further includes a detection network training unit, configured to: select training images, and train the global dichotomous branch network and the grid classification branch network with an aid of an image segmentation branch network based on the training images. The image segmentation branch network outputs segmentation images based on the training images, the segmentation images are reduced by a predetermined proportion relative to the training images, and pixel positions of the segmentation images are mapped corresponding to pixel positions of the image to be detected.

A third aspect of the disclosure is to provide a computer device, including a memory on which a computer program is stored and a processor. The processor, when executing the computer program, implements the safety belt detection method according to the first aspect of the present disclosure.

A fourth aspect of the disclosure is to provide a computer readable storage medium having stored thereon a computer program. The computer program, when executed by a processor, implements the safety belt detection method according to the first aspect of the present disclosure.

According to the safety belt detection method, apparatus, computer device and storage medium of the disclosure, using deep learning neural network to recognize the image to be detected can obtain higher accuracy and robustness. Among them, the global dichotomous branch network can quickly judge whether the driver wears a safety belt, and the grid classification branch network can detect the specific location information of the safety belt. At the same time, combined with the use of global dichotomous branch network and the grid classification branch network, it can quickly and accurately judge whether the driver wears the safety belt normatively. In addition, the disclosure uses the grid classification branch network to detect the position of the safety belt, which reduces the computational complexity compared with the conventional image segmentation network, has a large receptive field, and can achieve better detection effect.

DETAILED DESCRIPTION OF THE EMBODIMENTS

DMS monitors the driver's driving status and judges whether the driver has unsafe driving behaviors such as fatigue, distraction, smoking, calling and drinking water. In some applications, DMS needs to judge whether the driver wears the safety belt correctly and normatively from the image to be detected through image recognition technology. Safety belt recognition is usually affected by complex environmental background, light, driver's clothing accessories, safety belt folding and distortion, shielding and so on. However, in the process of image recognition, the safety belt is generally very slender, and sometimes it is not easy to distinguish from the background, and it is also easy to be affected by screen. Therefore, safety belt detection is different from conventional object detection, and its slender and changeable shape increases its detection difficulty. In this regard, it is hoped to provide a method that can accurately detect whether the driver wears the safety belt normatively.

Figure 1:
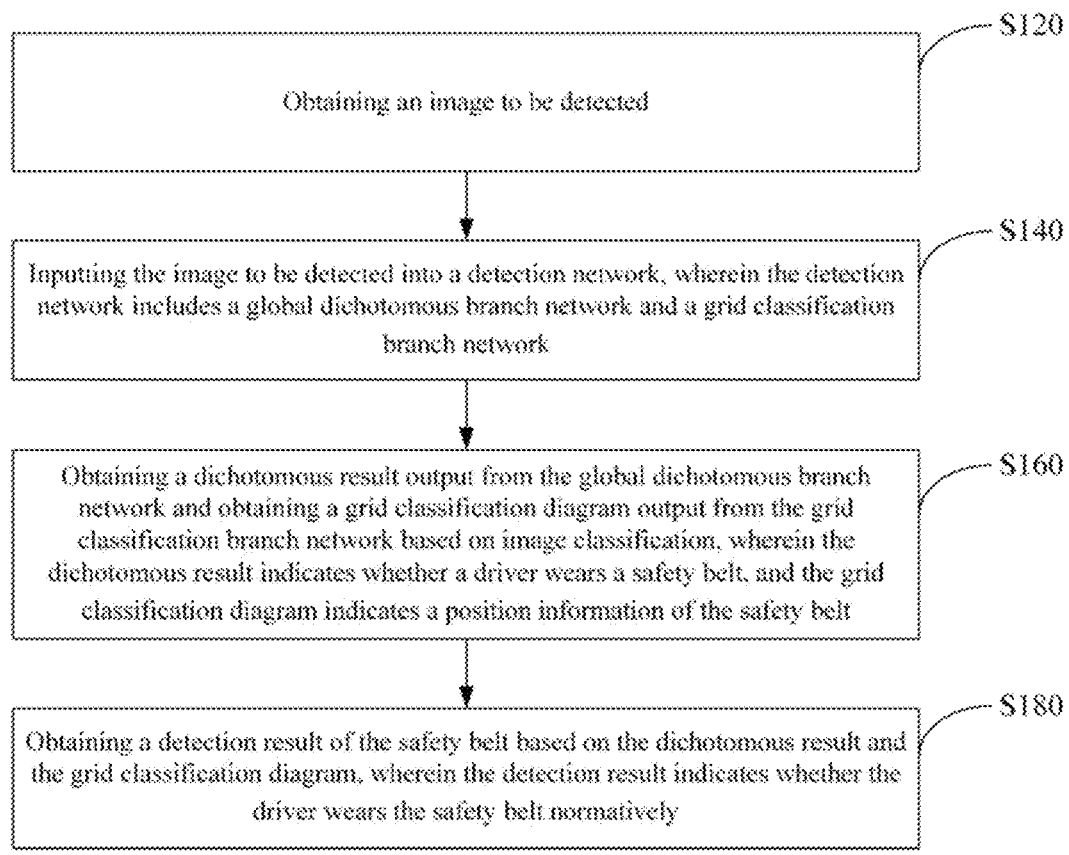
FIG. 1 is a flowchart of the safety belt detection method according to an embodiment of the present disclosure.

Referring to FIG. 1, the safety belt detection method provided in the present disclosure includes the following steps S120-S180.

S120: obtaining an image to be detected.

In an embodiment, the image to be detected is an image including the front of the driver's body. Preferably, the image to be detected includes the driver's upper body. From this image, it is possible to clearly obtain the information of whether the driver wears the safety belt normatively.

S140: inputting the image to be detected into a detection network, wherein the detection network includes a global dichotomous branch network and a grid classification branch network.

The detection network of the disclosure is a neural network based on deep learning. Among them, the global dichotomous branch network is used to obtain the information of whether the driver wears a safety belt, that is, whether there is a safety belt in the image. The grid classification branch network is used to identify the safety belt part and non safety belt part in the image based on the grid classification method. Among them, the grid classification method divides the image to be detected into multiple grids, and can quickly judge whether each grid in the image to be detected corresponds to the safety belt area based on the classification method, so as to output a grid classification diagram that can represent the specific position of the safety belt in the image to be detected.

S160: obtaining a dichotomous result output from the global dichotomous branch network and obtaining a grid classification diagram output from the grid classification branch network based on image classification, wherein the dichotomous result indicates whether a driver wears a safety belt, and the grid classification diagram indicates a position information of the safety belt.

In an embodiment, the dichotomous result includes a classification label L and a probability P. For example, the classification label L can be represented by "0" and "1", wherein the classification label L is "0" to represent that the driver is not wearing a safety belt, and the classification label L is "1" to represent that the driver is wearing a safety belt. The probability P represents the probability corresponding to the classification label. For example, when the output probability P is 0.994 and the classification label L is "1", the dichotomous results indicate that the driver has worn the safety belt, and the probability of wearing the safety belt is 99.4%.

The grid classification diagram is a classification diagram showing whether the image in each grid corresponds to the safety belt area after the image to be detected is divided into grids. The grid classification diagram is obtained by the grid classification branch network based on image classification reasoning. Image classification refers to assigning a label to an image from a given classification set, and the goal is to divide different images into different classes. In an embodiment, the grid classification diagram illustrates safety belt grids and other grids other than the safety belt grid, and the two kinds of grids are represented in different colors. The positions of the safety belt grids in the grid classification diagram can reflect the position of the safety belt in the image to be detected, so the position information of the safety belt can be obtained from the grid classification diagram.

S180: obtaining a detection result of the safety belt based on the dichotomous result and the grid classification diagram, wherein the detection result indicates whether the driver wears the safety belt normatively.

The dichotomous result can quickly judge whether the driver wears a safety belt, and the grid classification diagram can identify the position information of the safety belt and the shielding condition of the safety belt. For example, based on the dichotomous result, it is possible to first know at a glance whether the driver is wearing a safety belt. Further, the specific position of the safety belt is referred to according to the grid classification diagram. If the driver does not wear the safety belt normatively, the position of the safety belt will deviate from the predetermined position, so it can judge whether the driver wears the safety belt normatively.

According to the safety belt detection method of the above embodiment, using the deep learning neural network to recognize the image to be detected can obtain higher accuracy and robustness. Among them, the global dichotomous branch network can quickly judge whether the driver wears a safety belt, and the grid classification branch network can detect the specific position information of the safety belt. At the same time, combined with the use of global dichotomous branch network and grid classification branch network, it can quickly and accurately judge whether the driver wears the safety belt normatively.

Figure 2:
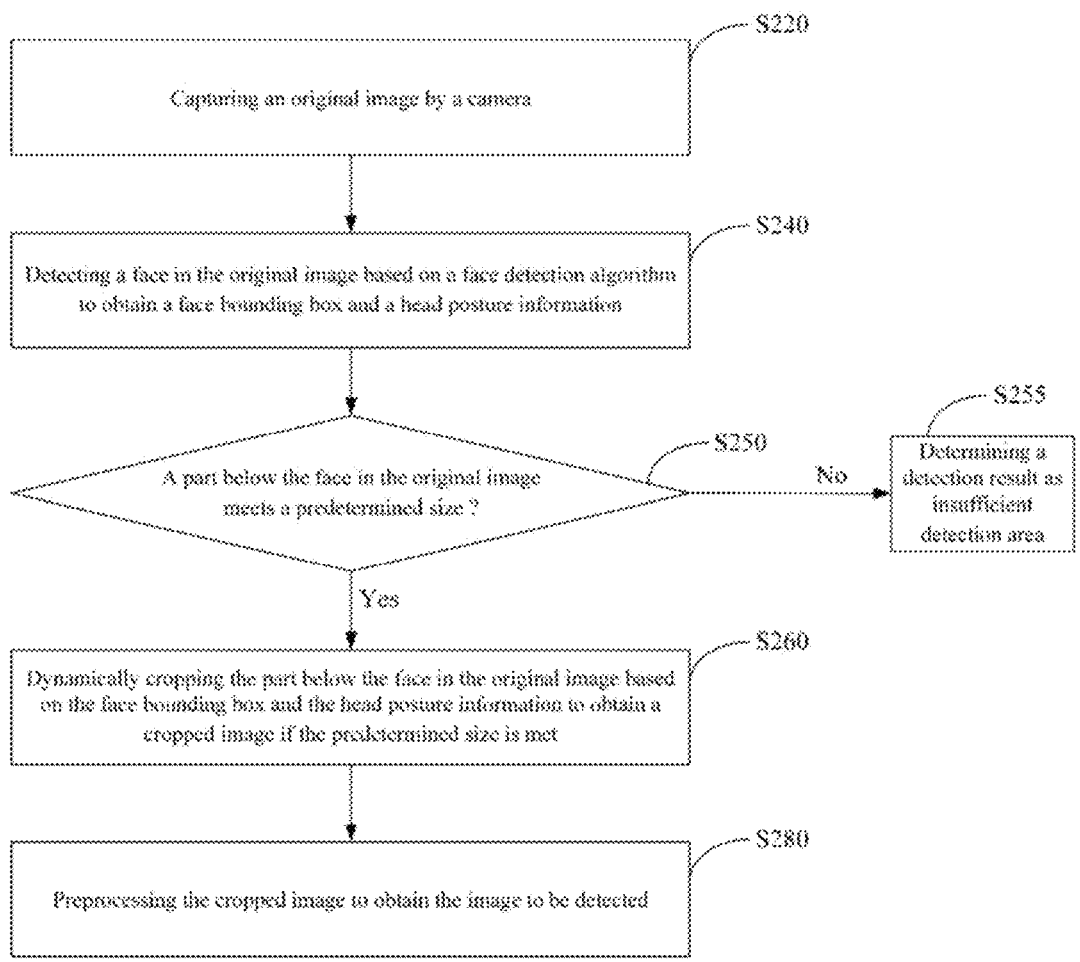
FIG. 2 is a flowchart of the safety belt detection method according to an embodiment of the present disclosure.
Figure 3:
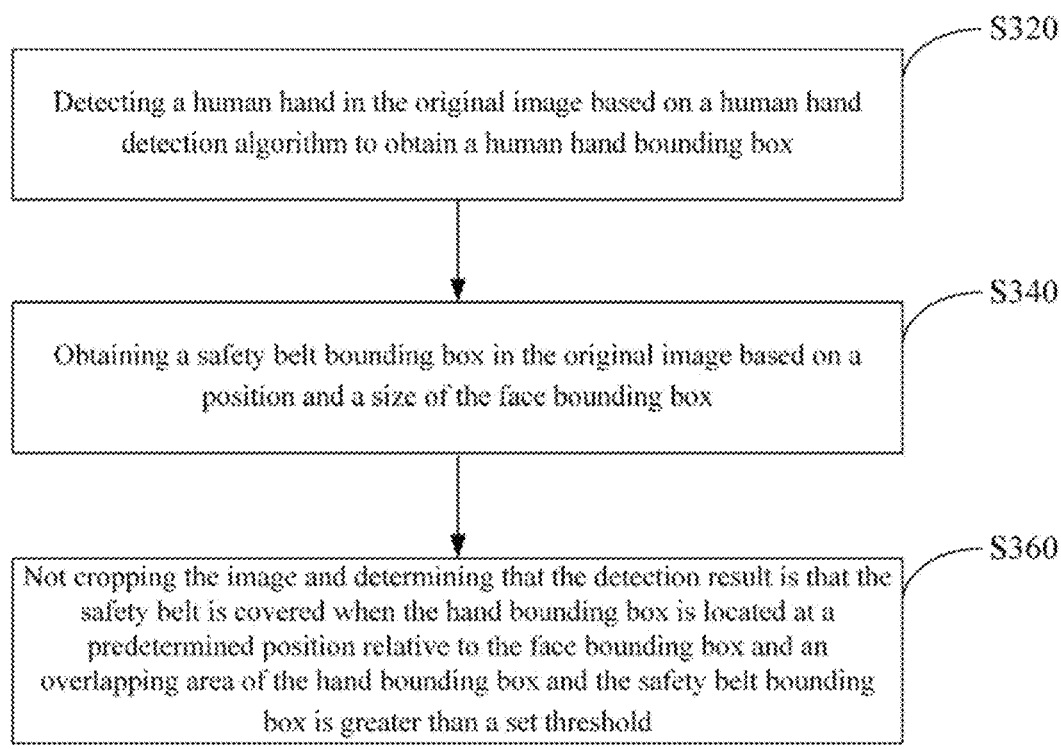
FIG. 3 is a flowchart of the safety belt detection method according to an embodiment of the present disclosure.

Referring further to FIG. 1 and FIG. 2, in an embodiment, step S102 further includes steps S220-S280.

S220: capturing an original image by a camera.

In an embodiment, the original image is an image taken by the DMS on the driver's position in real time by using an infrared camera (IR camera) during vehicle driving. Preferably, the IR camera includes an infrared fill light of 940 nm and a camera. The infrared fill light is used to illuminate and fill the shooting area to minimize the impact of light on safety belt detection. The present disclosure has no special restrictions on the position of the IR camera, as long as it can capture the front image of the driver, for example, it can be set in the front of the driver's seat or other positions.

S240: detecting a face in the original image based on a face detection algorithm to obtain a face bounding box and a head posture information.

In an embodiment, the face in the original image can be detected based on the deep learning method, and the face bounding box and bead posture information can be obtained. The head posture information includes, for example, a head pitch angle, a yaw angle, and a roll angle.

S250: determining whether a part below the face in the original image meets a predetermined size.

In an embodiment, whether the part below the face in the original image meets the predetermined size can be determined based on the position of the face bounding box in the original image. The part below the face in the original image can be considered as the safety belt detectable area. To judge whether the detectable area meets the predetermined size, so as to judge whether the image meets the requirements of the detection area, that is, it is necessary to ensure that the safety belt detectable area is sufficient. If the detectable area is too small and the information in the image is not enough to show the wearing of the safety belt, it is easy to lead to more misjudgments and omissions in the case of insufficient information.

S255: determining a detection result as insufficient detection area if the predetermined size is not met.

S260: dynamically cropping the part below the face in the original image based on the face bounding box and the head posture information to obtain a cropped image if the predetermined size is met.

In an embodiment, the lower right part of the lace bounding box in the original image is dynamically cropped. This area usually corresponds to the wearing position of the safety belt, and the image of this area can better present the wearing situation of the safety belt.

Preferably, the height of the cropped image is 2.2 times the height of the face bounding box, and the aspect ratio of the cropped image is determined according to the detection size of the detection network, that is, the aspect ratio of the cropped image is equal to the aspect ratio of the detection size. Considering that the driver's safety belt is worn on the left side, the cropping area is appropriately offset to the right side of the image along the horizontal direction. Further, considering that the yaw angle in the head posture information will affect the cropping, the cropping area is dynamically adjusted with the yaw angle along the horizontal direction. Further, considering that the image below the face may be large or small, the cropping area is appropriately offset upward along the vertical offset, so as to make the actual safety belt area closer to the central area of the cropped image.

S280: pre-processing the cropped image to obtain the image to be detected.

In an embodiment, the pre-processing includes scaling the cropped image to a predetermined size and normalizing the cropped image. Since the cropped image is usually the image of the driver's upper body, the cropped image may have different sizes. The cropped image is scaled to a predetermined size, in which the predetermined size is the detection size of the detection network, which can meet the detection size requirements of the detection network. Preferably, the cropped image can be scaled to 224×160 to adapt to the detection size of common neural networks. For example, normalizing makes the pixel values of the cropped image within the interval of $[-1,1]$.

Referring further to FIG. 2 to FIG. 5, in an embodiment, step S220 is followed by steps S320-S360.

S320: detecting a human hand in the original image based on a human hand detection algorithm to obtain a human hand bounding box. In an embodiment, the step S320 can be performed simultaneously with step S240, that is, face detection and hand detection can be performed simultaneously, both of which can be realized by deep learning. In this embodiment, face detection and hand detection are carried out before the safety belt detection of the image to be detected. In this way, the area where the hand blocks the safety belt can be judged before the safety belt detection is carried out, and the image to be detected that is more suitable for safety belt detection can be obtained. Face detection and hand detection can be performed in the same neural network for image recognition, or different neural networks can be set to perform face detection and hand detection respectively.

S340: obtaining a safety belt bounding box in the original image based on a position and a size of the face bounding box.

Figure 4:
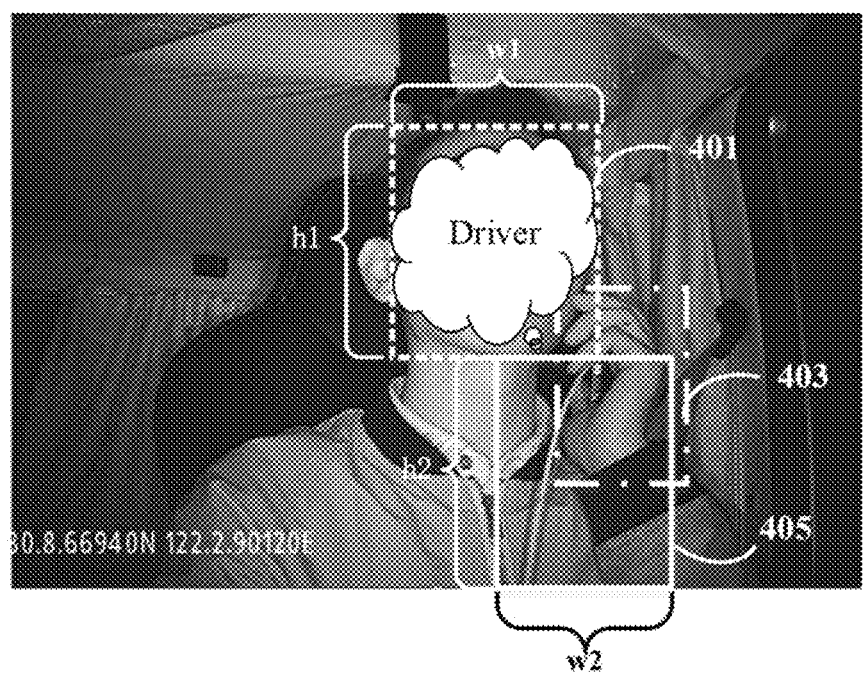
FIG. 4 is a schematic diagram of the original image according to an embodiment of the present disclosure.
Figure 5:
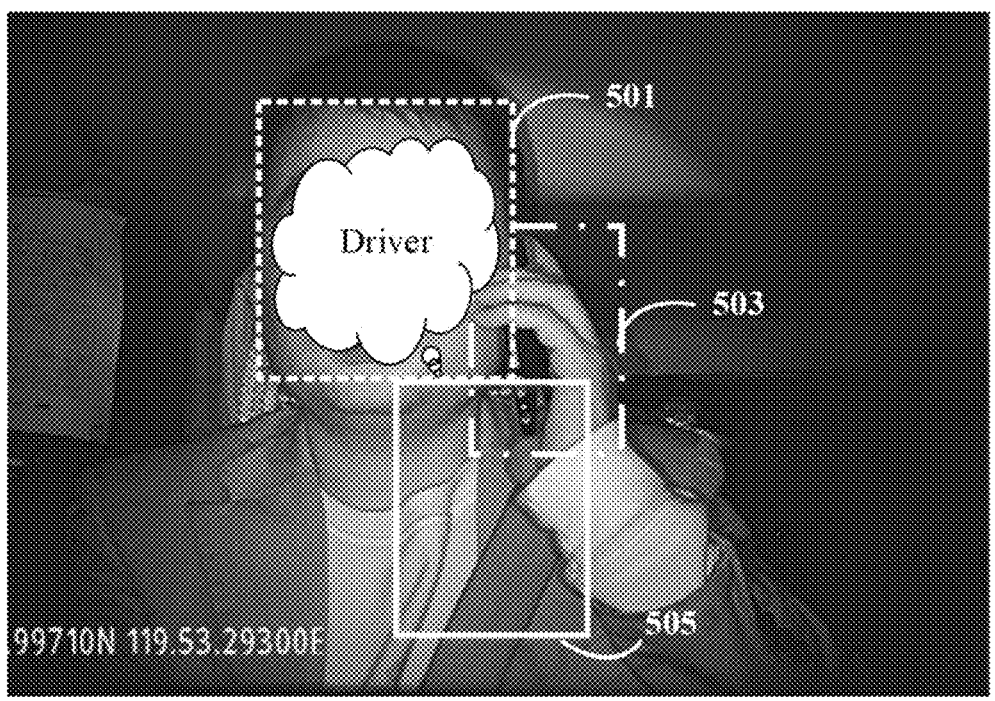
FIG. 5 is a schematic diagram of the original image according to an embodiment of the present disclosure.

Since the driver's safety belt usually extends from the driver's left shoulder to the right waist, the safety belt bounding box can be determined in the lower right part of the face bounding box. Referring further to FIG. 4 and FIG. 5, in an embodiment, the face bounding boxes 401 and 501 in the original image are shown in dashed lines, the hand bounding boxes 403 and 503 are shown in dotted lines, and the safety belt bounding boxes 405 and 505 are shown in solid lines. After the lace bounding boxes 401 and 501 are obtained through the face recognition algorithm, the safety belt bounding boxes 405 and 505 can be determined as follows: the midpoint of the lower rectangular edge of the face bounding boxes 401 and 501 is determined as the top left vertex of the safety belt bounding boxes 405 and 505, and the height h2 of the safety belt bounding boxes 405 and 505 is equal to the height H1 of the tee bounding boxes 401 and 501, the height w2 of safety belt bounding boxes 405 and 505 is ¾ times of the height w1 of face bounding boxes 401 and 501, that is, h1=h2, w2=(¾)w1.

It should be noted that there is no restriction on the order of executing step S320 and step S340. Step S320 or step S340 can be executed first, or the two steps can be executed at the same time.

S360: not cropping the image and determining that the detection result is that the safety belt is covered when the hand bounding box is located at a predetermined position relative to the face bounding box and an overlapping area of the band bounding box and the safety belt bounding box is greater than a set threshold.

As shown in FIG. 4, the hand bounding box 403 is located on the right side of the face hounding box 401, and the overlapping area of the hand bounding box 403 and the safety belt bounding box 405 is large, for example, greater than ¼ of the area of the safety belt bounding box. It can be judged that in the original image of FIG. 4, the hand position covers the safety belt area, so the detection result is determined that the safety belt is covered. In this case, the image is not cropped, and the processing flow may return to step S220 to recapture the original image to obtain an image to be detected that is more suitable for safety belt detection. Additionally or alternatively, it is also possible to notify the driver through the indicator light, display screen or voice that the hand action blocks the safety belt detection.

In an example, as shown in FIG. 5, although the hand bounding box 503 is located an the right side of the face bounding box 501, the overlapping area of the hand bounding box 503 and the safety belt bounding box 505 is small and is not greater than the set threshold. In this case, the detection result is not determined as the safety belt is covered. The set threshold may be, for example, ¼ of the area of the safety belt bounding boxes 405 and 505, or other set area thresholds.

Figure 6:
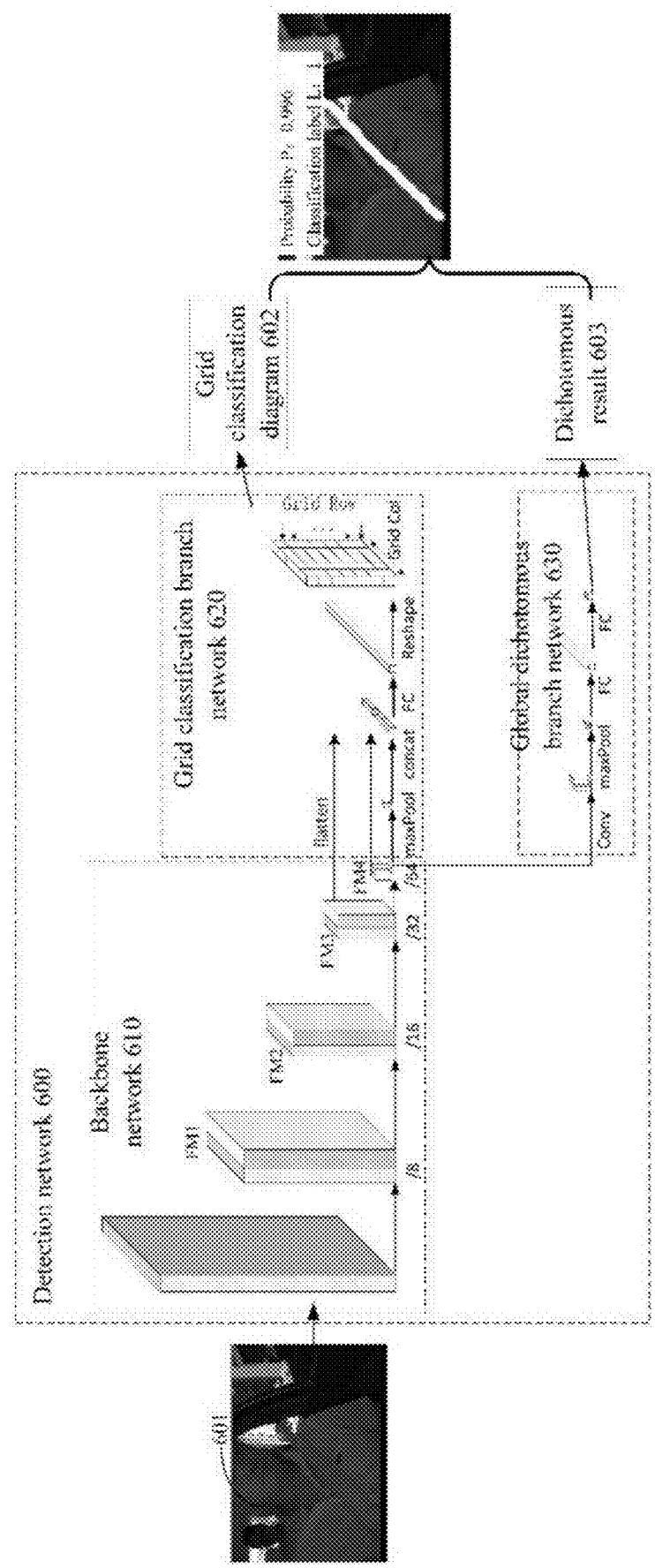
FIG. 6 is an outline diagram of the detection network according to an embodiment of the present disclosure.

Referring further to FIG. 6, in an embodiment, the detection network 600 also includes a backbone network 610. The backbone network 610 is a network for feature extraction, also known as the feature pyramid, which is used to extract the information of the input image and generate a feature map for subsequent branch networks. The backbone network 610 includes, for example, mobileNet series, shuffleNet series, GhostNet, etc. Preferably, the backbone network 610 is a lightweight mobileNetV2.

The processing of the driver image by the detection network will be described below with reference to FIG. 4. In an embodiment, before obtaining a dichotomous result output from the global dichotomous branch network and obtaining a grid classification diagram output from the grid classification branch network based on image classification, the safety belt detection method further includes: obtaining a convolution of the image to be detected 601 by the backbone network 610 to generate a feature map of the image to be detected, and using the feature map as an input of the global dichotomous branch network 630 and the grid classification branch network 620.

Specifically, the backbone network 610 includes, for example, a feature pyramid network. As shown in FIG. 6, the backbone network 610 performs convolution operation on the image 601 to be detected, and obtains the first feature map FM1, the second feature map FM2, the third feature map FM3 and the fourth feature map fm4 of different sizes. In the embodiment shown in FIG. 4, the size of the first feature FM1 is ⅛ of the input size of the detection network 600, the size of the second feature FM2 is 1/16 of the input size of the detection network 600, the size of the third feature FM3 is 1/32 of the input size of the detection network 600, and the size of the fourth feature FM4 is 1/64 of the input size of the detection network 600. In this embodiment, the backbone network 610 includes multi-layer convolution layers. The deeper the convolution layer is, the smaller the size of the corresponding output feature map is, the stronger the feature extraction ability is, and the deeper the feature extraction is. However, the form and times of feature extraction are not limited to this, as long as the feature of the image 601 to be detected can be extracted and the feature map can be generated for use by the subsequent grid classification branch network 620 and the global dichotomous branch network 630. The grid classification branch network 620 and the global dichotomous branch network 630 share the backbone network 610 for feature extraction to reduce the amount of computation.

In the global dichotomous branch network 630, the fourth feature map FM4 is input to the global dichotomous branch network, and the dichotomous result 403 is output through convolution (Conv), maxPool and full connection layer (FC) processing. The dichotomous result 403 includes as classification label L and a probability P to indicate whether the driver wears a safety belt. The global dichotomous branch network 630 outputs the classification confidence of whether there is a safety belt in the whole graph.

Figure 7:
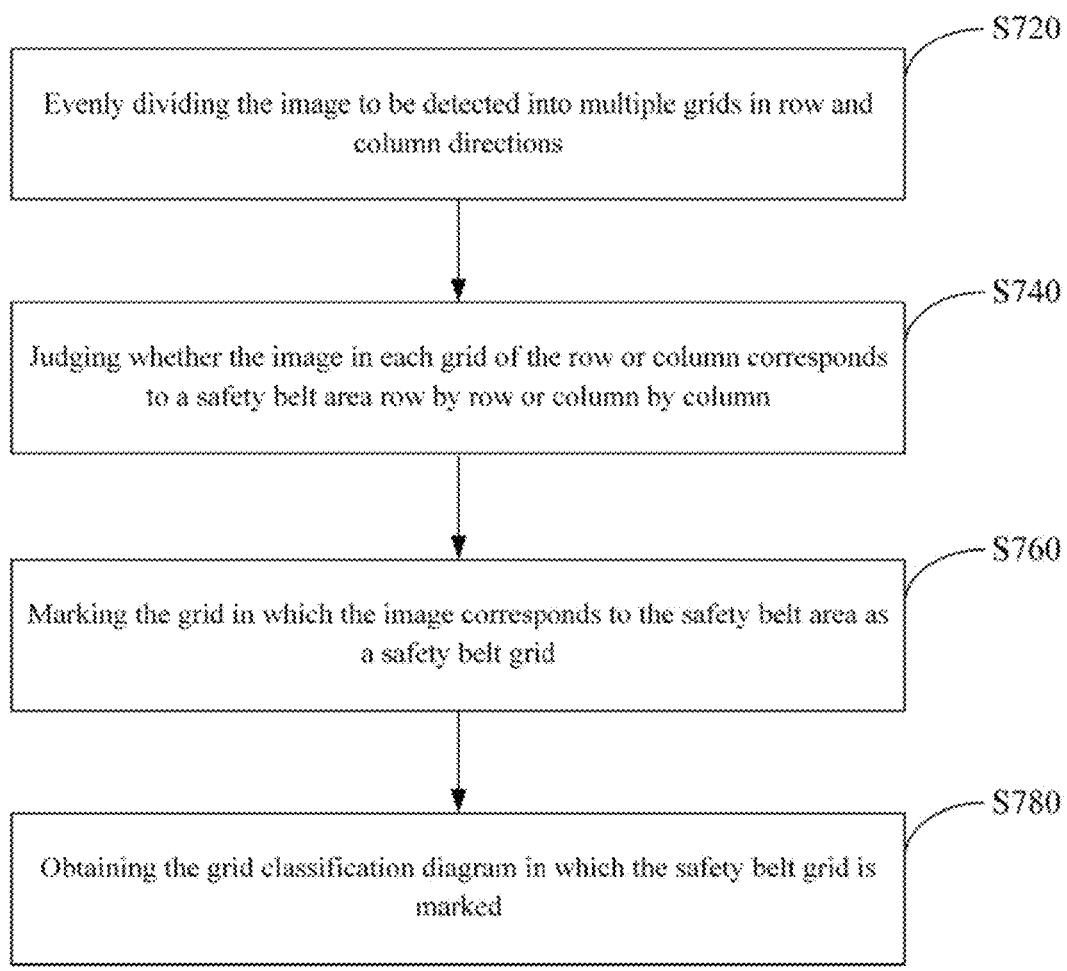
FIG. 7 is a flowchart of the safety belt detection method according to an embodiment of the present disclosure.

The grid classification branch network 620 is described below in connection with FIG. 6 to FIG. 8. The grid classification branch network of the present disclosure is a deep learning neural network for identifying the safety belt based on image classification. Using the grid classification branch network according to the disclosure for safety belt detection can be understood as looking for a set of safety belt positions in some rows or columns of the image, that is, position selection and classification based on the direction of rows or columns. In an embodiment, obtaining the grid classification diagram 602 output based on image classification from the grid classification branch network 620 includes the following steps S720-S780.

Figure 8:
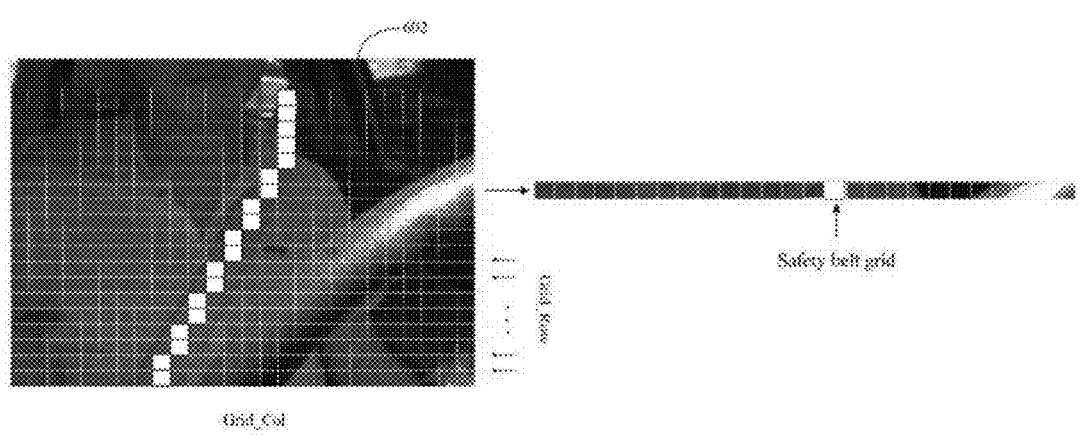
FIG. 8 is a schematic diagram of the grid classification diagram according to an embodiment of the present disclosure.

S720: evenly dividing the image to be detected into multiple grids in row and column directions Referring to FIG. 8, in an embodiment, the image to be detected is evenly divided into grids of h rows and w columns in the row and column directions, and h and w are positive integers greater than 2. That is, the image to be detected is arranged by h rows of grids, and the number of grids in each row is w. Each grid should contain multiple pixels. In practical implementation, h=30, w=25. In other embodiments, h and w can also select other values according to the size of the image to be detected.

S740: judging whether the image in each grid of the row or column corresponds to a safety belt area row by row or column by column.

The following describes the grid classification branch network by taking row-based classification detection as an example. In the example shown in FIG. 8, the safety belt to be detected extends from the left shoulder of the driver to the right waist of the driver (the safety belt worn in the up and down direction). In this case, the image to be detected is subjected to softmax normalization row by row to obtain the confidence $Prob_{j,:}$ that the corresponding image in each grid in this row is the safety belt area. The confidence $Prob_{j,:}$ can be calculated by the following formula:

$$Prob_{j,:}=\text{softmax}(P_{j,0:w}), s.t. j \in =[0, h-1]$$

Where, $P_{j,0,w}$ is the w+1 dimension vector, which represents the prediction confidence of each grid cell in the grid in row j. It should be noted that the sequence number of each grid cell is from 1 to w, and the sequence number 0 is the background.

S760: marking the grid in which the image corresponds to the safety belt area as a safety belt grid.

If there is a grid in a row with a confidence greater than the set threshold (for example, 0.5), the row is considered to have a safety belt area, and the grid is marked as a safety belt grid. Preferably, the "safety belt area" in this embodiment refers to the area where the safety belt centerline is located. The above grid classification based on the row direction only predicts and infers the area where the safety belt centerline is located, that is, only the grid in which the image corresponds to the area where the safety belt centerline is located is marked as the safety belt grid.

S780: obtaining the grid classification diagram in which the safety belt grid is marked.

In an embodiment, the grid classification diagram 602 is shown in FIG. 8, wherein the white grids represent the safety belt grids.

In the above embodiment, the grid classification detection (grid classification based on row direction) of the image to be detected row by row is described in detail. It should be understood that in other embodiments, grid classification detection can also be performed on the image to be detected column by column to determine whether the image in each grid in the column corresponds to the safety belt area (grid classification based on the column direction). In this case, it is more suitable for detecting the safety belt extending in the left and right directions.

Referring to FIG. 6, the third feature map FM3 and the fourth feature map FM4 generated by the backbone network and the 1×1 feature layer after maxPool are subjected to concat, and then the global feature is obtained by using the full connection (FC) layer, so that the receptive field is the full image size of the image to be detected. Then, the Reshape operation is performed for the one-dimensional vector of the global feature. Reshape is a common operation in convolutional neural networks. In this embodiment, Reshape transforms a one-dimensional vector with a length of grid_col×grid_row×1 into a two-dimensional matrix of grid_row×grid_col, and finally the grid classification diagram 602 is output. Among them, grid_col represents the column of end classification diagram, grid_row represents the row of the grid classification diagram.

In the traditional method of recognizing the position of safety belt in the image, the safety belt part and non-safety belt part in the image are recognized pixel by pixel based on the semantic segmentation technology in the field of image recognition. Semantic segmentation technology understands the image from the pixel level, and the pixels of the same class are classified into one class. For the image to be detected with H×W pixels, the traditional semantic segmentation method needs to deal with H×W classification problems. According to the grid classification branch network of the present disclosure, it only needs to complete the softmax classification of multiple grids in the row or column row by row or column by column. Therefore, it only needs to deal with h classification problems, where h is the number of rows of the grid, and h is usually much less than the image height H. Therefore, the computational complexity is much less than that of image segmentation methods. In addition, the segmentation network adopts full convolution network, and the local receptive field is small. Therefore, the row based grid classification uses the full connection layer classification mechanism and for the safety belt position of any row, the receptive field is the size of the full image, so it can achieve a good detection effect. According to the grid classification branch network of the disclosure, the position information of the safety belt can be obtained quickly and accurately.

Preferably, the convolution operation in the backbone network 610, the grid classification branch network 620 and the global dichotomous branch network 630 can use separable convolution to further reduce the amount of operation.

Figure 9:
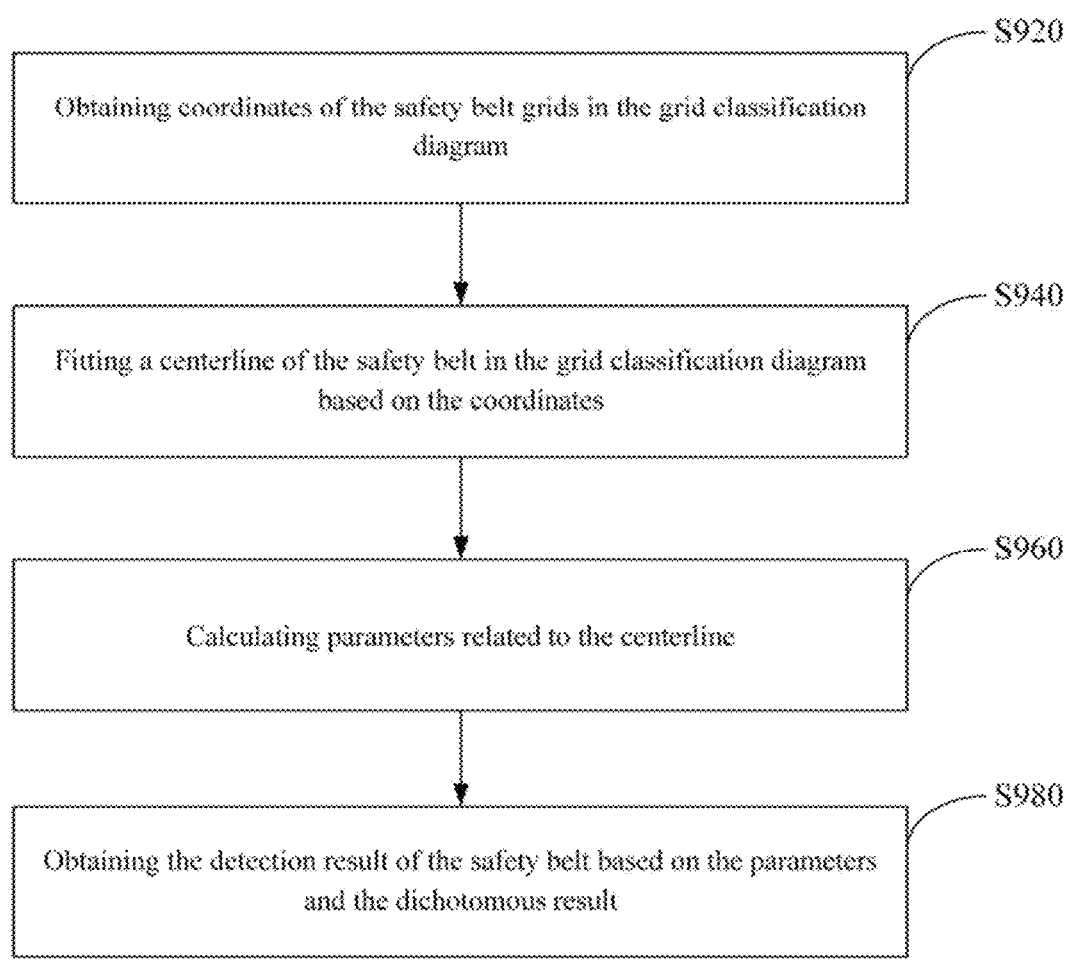
FIG. 9 is a flowchart of the safety belt detection method according to an embodiment of the present disclosure.

In an embodiment, as shown in FIG. 9, step S180 specifically includes steps S920-S980.

S920: obtaining coordinates of the safety belt grids in the grid classification diagram.

In steps S740 and S760, if a safety belt grid is marked in a row, the row coordinates of the row are recorded and the corresponding column coordinates of the safety belt grid in the grid classification diagram are determined.

S940: fitting a centerline of the safety belt in the grid classification diagram based on the coordinates.

The coordinates of the safety belt grid are multiple discrete points. In practical application, the least square method can be used to fit the centerline of the safety belt in the grid classification diagram based on multiple coordinates. It should be understood that the centerline is first-order, and other algorithms can be used to fit the coordinate points of multiple safety belt coordinates into a straight line, as long as it can reflect the position of the safety belt in the image to be detected.

S960: calculating parameters related to the centerline.

In an embodiment, the parameters related to the centerline include an included angle between the centerline and a predetermined direction, and a relative position between the centerline and the driver's shoulder. Preferably, the included angle between the centerline and the horizontal direction is calculated by the following formula:

$$\theta = \arctan(k)$$

Where k is the slope of the first-order centerline.

The relative position between the centerline and the driver's shoulder can be obtained based on the position of the centerline and the horizontal line of the driver's shoulder, in which the horizontal line of the driver's shoulder can be replaced by the Y coordinate in the lower right corner of the face bounding box.

S980: obtaining the detection result of the safety belt based on the parameters and the dichotomous result.

In an embodiment, the detection results include normative wearing of safety belt, non-normative wearing of safety belt, uncertainty and insufficient detection area.

For example, as described in the above embodiment, when the part below the face in the original image does not meet the predetermined size, for example, when the area of the part below the face in the original image is less than 1.2 times the face bounding box area, the detection result obtained is insufficient detection area. When the proportion of the point on the centerline of the safety belt above the person's shoulder exceeds 80%, it can be considered that the driver has fastened the safety belt behind him, and the test result obtained is that the safety belt is non-normative wearing of safety belt. When the included angle between the centerline of the safety belt and the horizontal direction is $\theta > 70°$ or $\theta < 25°$, it can be considered that the driver does not wear the safety belt normatively, and the test result obtained is that the safety belt is non-normative wearing of safety belt. When the length of the safety belt area in the grid classification diagram is shorter than the cropped image area or is separated into more than one section, it can be considered that the safety belt is covered, and the detection result is uncertainty. When the probability P in the dichotomous result is less than the predetermined value, it can be considered that the confidence of the dichotomous result is low and the obtained detection result is uncertain. When the included angle between the centerline of the safety belt and the horizontal direction is $25° \leq \theta \leq 70°$ and the proportion of the point on the centerline of the safety belt above the person's shoulder is not more than 80%, the driver can be considered to wear the safety belt normatively, and the test result obtained is normative wearing of safety belt. In a further embodiment, when the length of the safety belt area in the grid classification diagram is shorter than the cropped image area or is separated into more than one section, or when the safety belt is not detected by the detection network, the processing of S320-S360 in FIG. 3 can be performed. At this time, the detection result obtained is that the safety belt is covered by hands.

In a preferred embodiment, the above safety belt detection method is executed continuously or at a predetermined time interval, and multiple detection results obtained by repeatedly executing the safety belt detection method are summarized to determine whether the proportion of a certain type of detection result in all detection results reaches a predetermined threshold, and the detection results reaching the threshold are output. For example, a sliding window queue with a fixed time window can be created, such as 5 s. The above safety belt detection method can be executed continuously or at a predetermined time interval, multiple detection results can be sent to the queue, and whether the proportion of a certain type of detection result in all detection results reaches a predetermined threshold can be judged. If the detection result output through multi frame judgment is non-normative wearing of safety belt, DMS will give an alarm. Combined with the comprehensive judgment of multiple detection results, the reliability of detection results can be improved.

According to the safety belt detection method of the above embodiment, using the deep learning neural network to recognize the image to be detected can obtain higher accuracy and robustness. Among them, the global dichotomous branch network can quickly judge whether the driver wears a safety belt, and the image segmentation branch network can detect the specific position information of the safety belt. At the same time, combined with the use of global dichotomous branch network and grid classification branch network, it can quickly and accurately judge whether the driver wears the safety belt normatively. In addition, the grid classification branch network according to the present disclosure reduces the amount of computation compared with the conventional image segmentation network.

In an embodiment, the safety belt detection method according to the disclosure also includes training the detection network. Before using the detection network of the disclosure to model infer the image to be detected to obtain the detection result, training the detection network can improve the detection efficiency and accuracy of the detection network. Training the detection network includes selecting training images and training the global dichotomous branch network and the grid classification branch network with an aid of an image segmentation branch network based on the training images. The image segmentation branch network outputs segmentation images based on the training images, the segmentation images are reduced by a predetermined proportion relative to the training images, and pixel positions of the segmentation images are mapped corresponding to pixel positions of the image to be detected.

In this embodiment, the training images can be selected from the front view or side view of the driver obtained by the DMS. The training images include the images of the driver wearing the safety belt and the images of the driver not wearing the safety belt, and is correspondingly divided into the label images of wearing the safety belt and the label images of not wearing the safety belt. The label images are used as mask images for training. The global dichotomous branch network is trained by the label images of the wearing safety belt and not wearing safety belt. The loss function for training the global dichotomous branch network adopts Focal loss FL $$FL(y', y) = \begin{cases} -\alpha(1-y')^\gamma \log y', & y=1 \\ -(1-\alpha)y'^\gamma \log(1-y'), & y=0 \end{cases}$$

Where, α is the balance factor, which is used to balance the uneven proportion of positive and negative samples. γ is the rate factor, which is used to adjust the rate at which the weight of simple samples decreases. y represents classification label. y' represents the output result of the grid classification branch network.

The global classification branch loss function $L_{cls}$ is as follows:

$$L_{cls} = \sum_i^m FL(P_i, T_i)$$

Where m represents the number of classification categories, $P_i$ represents the confidence that the prediction belongs to class i, $T_i$ represents the one-hot label vector belonging to class i, and m is 2 in the global dichotomous branch network.

For the grid classification branch network, the label images of wearing safety belt are used to train it. The label images of wearing safety belt are binary images. In the label images of wearing safety belt, the pixels of the safety belt are assigned 1 and the pixels of non-safety belt are assigned 0. When training the grid classification branch network, the label images of wearing safety belt are divided into grids. Only the grids where the safety belt centerline is located is assigned as 1, and the other grids are assigned as 0.

The loss function for training the grid classification branch network adopts Focal loss $L_{grid}$, and the Focal loss $L_{grid}$ is as follows:

$$L_{grid} = \sum_{j=0}^{h-1} FL(P_{j,:}, T_{j,:})$$

Where, $P_{j,:}$ is the (w+1)-dimensional vector, which represents the prediction confidence of each grid cell in the grid in row j. T represents the one-hot label vector of the grid in row j. h is the total number of grid rows, that is, $L_{grid}$ is the result of the accumulation of all grid row losses.

Figure 10:
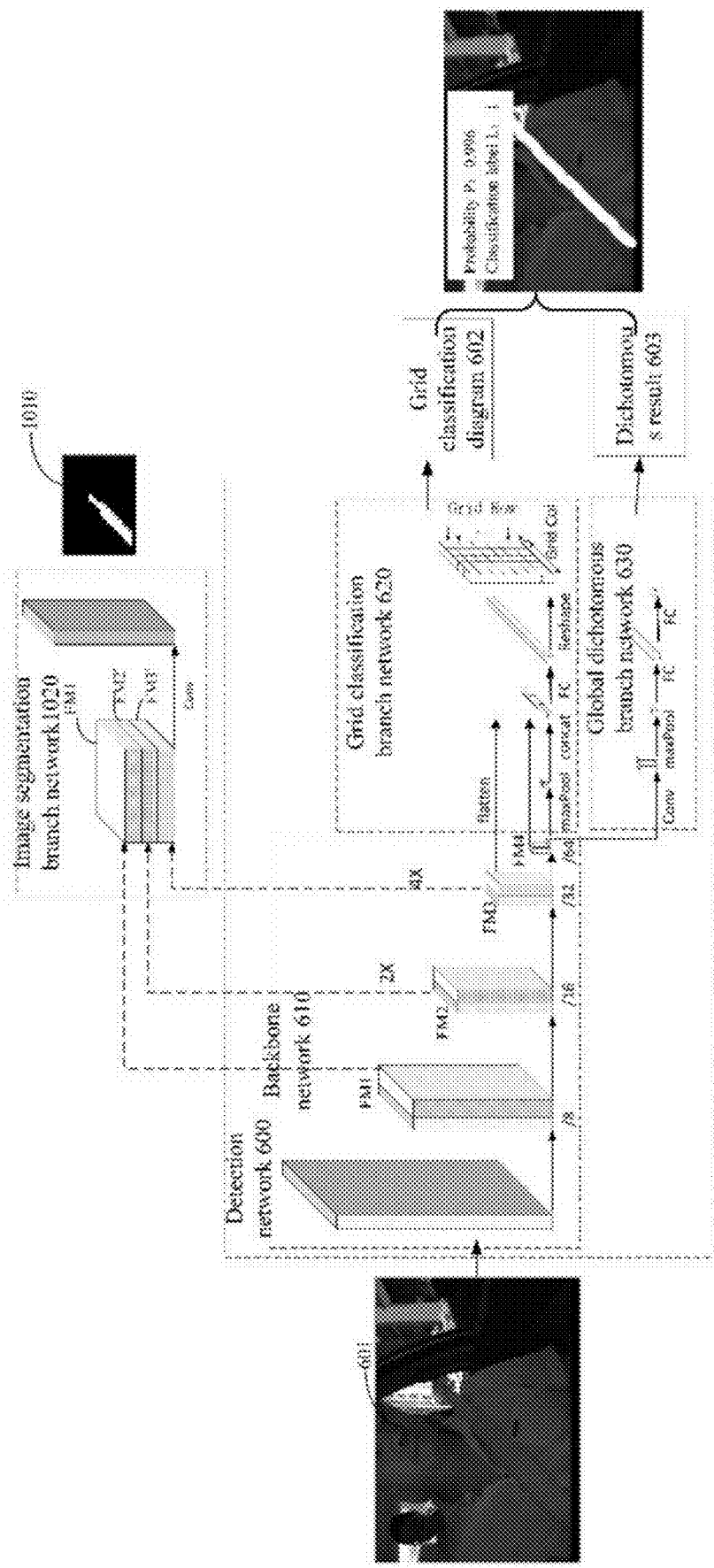
FIG. 10 is an outline schematic diagram of the detection network according to an embodiment of the present disclosure.

Referring to FIG. 10, in an embodiment, the image segmentation branch network 1020 is used to assist in training the global dichotomous branch network 630 and the grid classification branch network 620.

The auxiliary segmentation branch network 1020 shares the feature extraction of the backbone network with the grid classification branch network 620 and the global dichotomous branch network 630. Based on the three feature layers of backbone network ⅛, 1/16 and 1/32 (i.e. the first feature map FM1, the second feature map FM2 and the third feature map FM3 in FIG. 10), the auxiliary segmentation branch network 1020 samples the same size as the first feature map FM1 to obtain the second adjustment feature map FM2' and the third adjustment feature map FM3' respectively. Then, the first feature map FM1, the second adjustment feature map FM2' and the third adjustment feature map FM3' are spliced and fused on the channel, and then are output to the ⅛ size through the convolution processing of the image segmentation branch network 1020 to obtain the segmentation image 1010. The pixel position of the segmentation image 1010 is mapped one by one with the input image, which can be used to locate the position of the safety belt pixel on the original image.

For example, in the example of FIG. 10, when the size of the driver picture 601 input to the detection network is 224×160, the size of the first feature map FM1 is 28×20, that is, the size of the spliced feature map input to the image segmentation branch network 1020 is also 28×20, and the size of the segmentation image 1010 output from the image segmentation branch network 1020 is also 28×20. And the pixel position of the segmentation image 1010 is mapped corresponding to the pixel position of the image to be detected 601. The segmentation image 1010 is a map of the image to be detected 601, in which white pixels represent the safety belt and black pixels represent the background of the non-safety belt. The segmentation image 1010 can be used to locate the position of safety belt pixels in the image to be detected. The segmentation image 1010 output by the image segmentation branch network 1020 of this embodiment is reduced by a predetermined size relative to the input image, and can be used to locate the position of safety belt pixels on the original image. In other words, the segmentation image 1010 does not need to encode to the input size, reducing the network complexity and therefore the amount of calculation.

The image segmentation branch network 1020 is only effective when training the detection network 600 and is used to accelerate convergence when training the grid classification branch network and the global dichotomous branch network. The image segmentation branch network 1020 does not need to be used in the process of model reasoning using the detection network 600. Therefore, the image segmentation branch network 1020 does not affect the speed of model reasoning.

According to the safety belt detection method of the above embodiment, using the deep learning neural network to recognize the image to be detected can obtain higher accuracy and robustness. Among them, the global dichotomous branch network can quickly judge whether the driver wears a safety belt, and the grid classification branch network can detect the specific position information of the safety belt. At the same time, combined with the use of global dichotomous branch network and grid classification branch network, it can quickly and accurately judge whether the driver wears the safety belt normatively. In addition, the disclosure uses the grid classification branch network to detect the specific position information of the safety belt, which can significantly reduce the computational complexity compared with the traditional image segmentation method.

Figure 11:
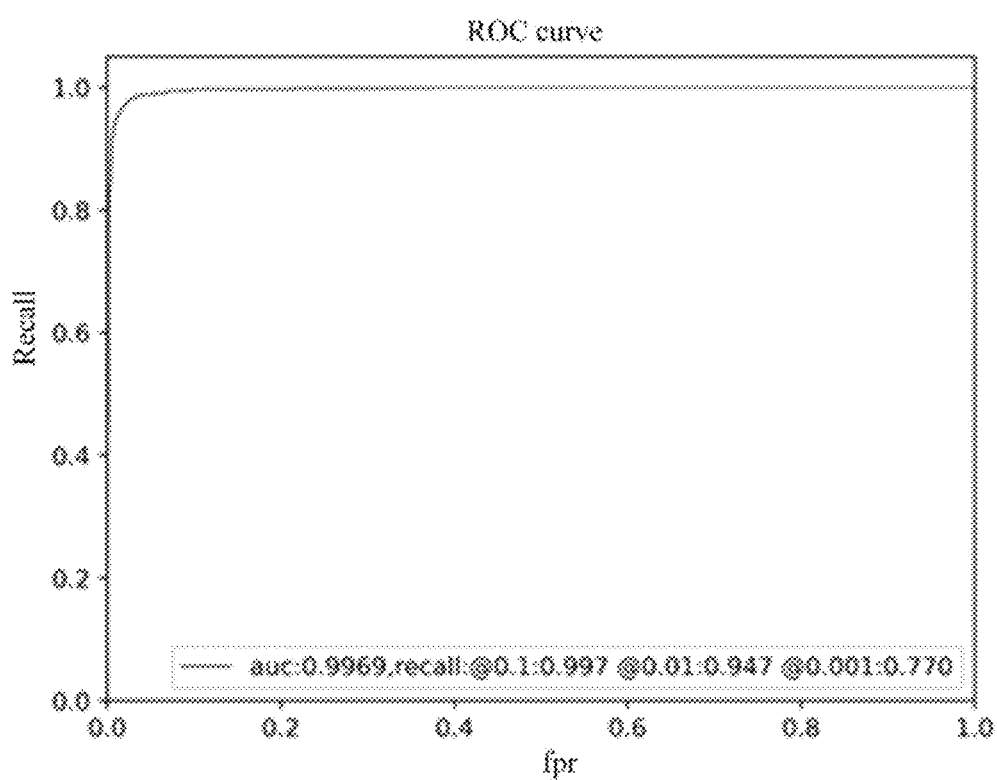
FIG. 11 is a schematic diagram of a test result of the detection network according to an embodiment of the present disclosure.

In the actual test, the detection network according to the disclosure has good performance, as follows:
(1) Safety Belt Positioning Performance The position of the center point of the safety belt in each row obtained by the grid classification branch was compared with the position of the grow truth. If the distance was within 10 pixels, it was considered that the center position of the safety belt was correct, otherwise it was wrong. The statistical accuracy of the test set was 96.34%.
(2) Safety Belt Classification Performance The confusion matrix was calculated from the result of global dichotomous branch, and the ROC curve was obtained, as shown in FIG. 11. When the confidence threshold score_th=0.90, the classification accuracy was 97.152%
(3) Amount of Calculation The backbone network was mobilenetv2, the size of the input image to be detected was 224×160 and the amount of calculation Flops is 0.22 GMac, which can meet the needs of real-time operation of embedded devices.

Figure 12:
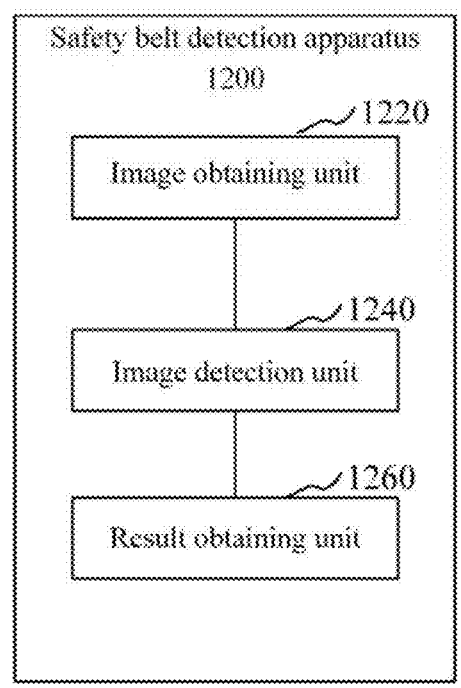
FIG. 12 is a structural block diagram of the safety belt detection apparatus according to an embodiment of the present disclosure.

According to another aspect of the present disclosure, as shown in FIG. 12, a safety belt detection apparatus 1200 is provided, including an image obtaining unit 1220, an image detection unit 1240, and a result obtaining unit 1260. The image obtaining unit 1220 is configured to obtain an image to be detected. The image detection unit 1240 is configured to input the image to be detected into a detection network. The detection network includes a global dichotomous branch network and a grid classification branch network, and obtains a dichotomous result output from the global dichotomous branch network and obtains a grid classification diagram output from the grid classification branch network based on image classification. The dichotomous result indicates whether a driver wears a safety belt, and the grid classification diagram indicates a position information of the safety belt. The result obtaining unit 1260 is configured to obtain a detection result of the safety belt based on the dichotomous result and the grid classification diagram. The detection result indicates whether the driver wears the safety belt normatively.

Figure 13:
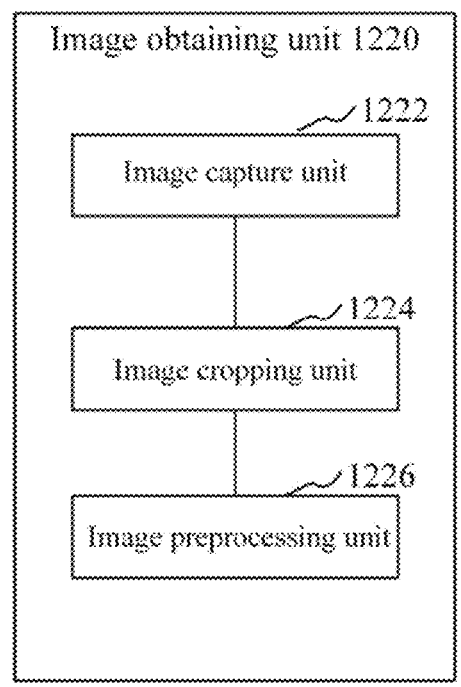
FIG. 13 is a structural block diagram of the safety belt detection apparatus according to an embodiment of the present disclosure.

In an embodiment, as shown in FIG. 13, the image obtaining unit 1220 includes an image capture unit 1222, an image cropping unit 1224, and an image pre-processing unit 1226. The image capture unit 1222 is configured to capture an original image by a camera. The image cropping unit 1224 is configured to: detect a face in the original image based on a face detection algorithm to obtain a face bounding box and a head posture information, determine whether a part below the face in the original image meets a predetermined size, determine a detection result as insufficient detection area if the predetermined size is not met; or dynamically crop the part below the face in the original image based on the face bounding box and the head posture information to obtain a cropped image if the predetermined size is met. The image preprocessing unit 1226 is configured to pre-process the cropped image to obtain the image to be detected.

In an embodiment, the image cropping unit 1224 is further configured to: detect a human hand in the original image based on a human hand detection algorithm to obtain a human hand bounding box, obtain a safety belt bounding box in the original image based on a position and a size of the face bounding box, and determine that the detection result is that the safety belt is covered when the hand bounding box is located at a predetermined position relative to the face bounding box and an overlapping area of the hand bounding box and the safety belt bounding box is greater than a set threshold.

In an embodiment, the image detection unit 1240 includes a grid classification branch network detection unit configured to: divide the image to be detected into a plurality of grids in row and column directions, judge whether the image in each grid of the row or column corresponds to a safety belt area row by row or column by column, mark the grid in which the image corresponds to the safety belt area as a safety belt grid, and obtain the grid classification diagram in which the safety belt grid is marked.

Figure 14:
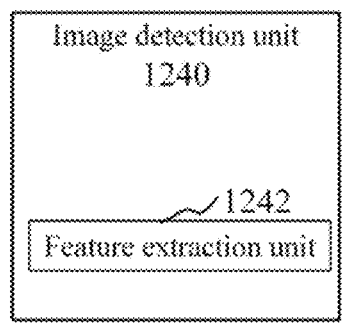
FIG. 14 is a structural block diagram of the safety belt detection apparatus according to an embodiment of the present disclosure.

In an embodiment, the detection network farther includes a backbone network, as shown in FIG. 14. The image detection unit further includes: a feature extraction unit 1242, and the feature extraction unit 1242 is configured to obtain a convolution of the image to be detected by the backbone network to generate a feature map of the image to be detected, and use the feature map as an input of the global dichotomous branch network and the grid classification branch network.

Figure 15:
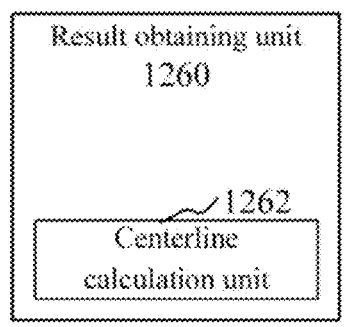
FIG. 15 is a structural block diagram of the safety belt detection apparatus according to an embodiment of the present disclosure.

In an embodiment, as shown in FIG. 15, the result obtaining unit 1260 includes a centerline calculation unit 1262. The centerline calculation unit 1262 is configured to obtain coordinates of the safety belt grids in the grid classification diagram, fit a centerline of the safety belt in the grid classification diagram based on the coordinates and calculate parameters related to the centerline. The result obtaining unit 1260 is further configured to obtain the detection result of the safety belt based on the parameters and the dichotomous result.

In an embodiment, the parameters related to the centerline includes: an included angle between the centerline and a predetermined direction, and a relative position between the centerline and the driver's shoulder.

Figure 16:
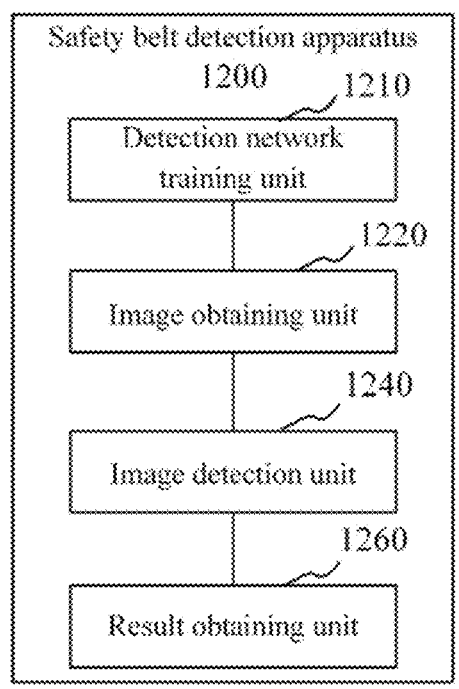
FIG. 16 is a structural block diagram of the safety belt detection apparatus according to an embodiment of the present disclosure.

In an embodiment, as shown in FIG. 16, the safety belt detection apparatus further includes a detection network training unit 1210. The detection network training unit 1210 is configured to select training images, and train the global dichotomous branch network and the grid classification branch network with an aid of an image segmentation branch network based on the training images. The image segmentation branch network outputs segmentation images based on the training images, the segmentation images are reduced by a predetermined proportion relative to the training images, and pixel positions of the segmentation images are mapped corresponding to pixel positions of the image to be detected.

The safety belt detection apparatus of the disclosure corresponds to the safety belt detection method of the disclosure one by one. It is hereby declared that the technical features and beneficial effects described in the embodiments of the above safety belt detection method are applicable to the embodiments of the safety belt detection apparatus.

Figure 17:
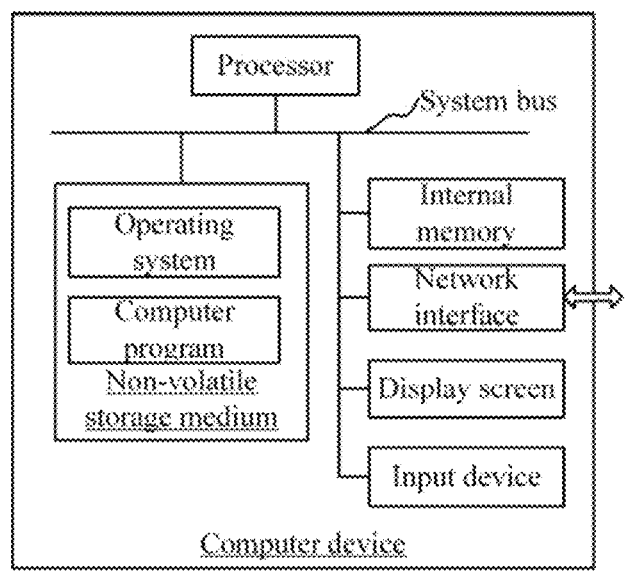
FIG. 17 is a schematic diagram of an internal structure of the computer device according to an embodiment of the present disclosure.

According to another aspect of the present disclosure, a computer device is provided, which can be a terminal, and its internal structure diagram can be shown in FIG. 17. The computer device includes a processor, a memory, a network interface, a display screen and an input device connected through a system bus. The processor of the computer device is used to provide computing and control capabilities. The memory of the computer device includes a non-volatile storage medium and an internal memory. The non-volatile storage medium stores a step system and a computer program. The internal memory provides an environment for the running of the step system and the computer program in the non-volatile storage medium. The network interface of the computer device is used for communicating with an external terminal via a network connection. The computer program is executed by the processor to implement the computer. The display screen of the computer device may be a liquid crystal display screen or an electronic ink display screen, and the input device of the computer device may be a touch layer covered on the display screen, or may be a key, a trackball, or a touch pad disposed on a housing of the computer device, or may also be an external keyboard, a touch pad, a mouse, or the like.

A person skilled in the art would understand that the structure shown in FIG. 17 is merely a block diagram of a part of the structure related to the solution of the present disclosure, and does not constitute a limitation to the computer device to which the solution of the present disclosure is applied, and the specific computer device may include more or less components than those shown in the figure, or combine some components, or have different component arrangements.

In an embodiment, a computer device is further provided, including a memory on which a computer program is stored and a processor. The processor, when executing the computer program, implements the steps in the foregoing embodiments of the above method.

In an embodiment, a computer readable storage medium having stored thereon a computer program. The computer program, when executed by a processor, implements the steps in the foregoing embodiments of the above method.

A person of ordinary skill in the art would understand that all or part of the processes of the method in the foregoing embodiments may be implemented by a computer program instructing relevant hardware. The computer program may be stored in a non-volatile computer readable storage medium. When the computer program is executed, the computer program may include the processes of the embodiments of the above method. Any reference to memory, storage, database or other media used in the embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (Synchlink SLDRAM), rambus, direct RAM (RDRAM), direct rambus dynamic RAM (DRDRAM), and rambus dynamic RAM (RDRAM), and so on.

The technical features of the above embodiments can be combined arbitrarily. In order to make the description concise, all possible combinations of the technical features in the above embodiments are not described. However, as long as there is no contradiction in the combination of these technical features, it shall be considered to be the scope recorded in the specification.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the inventive concept, which all belong to the scope of protection of the present disclosure. Therefore, the scope of protection of the present disclosure shall be subject to the appended claims.

What is claimed is:

1. A safety belt detection method, comprising:
 obtaining an image to be detected, wherein the step of obtaining an image to be detected further comprises:
 capturing an original image by a camera;
 detecting a face in the original image based on a face detection algorithm to obtain a face bounding box and a head posture information;
 determining whether a part below the face in the original image meets a predetermined size;
 determining a detection result as insufficient detection area if the predetermined size is not met;
 dynamically cropping the part below the face in the original image based on the face bounding box and the head posture information to obtain a cropped image if the predetermined size is met; and
 pre-processing the cropped image to obtain the image to be detected;
 inputting the image to be detected into a detection network, wherein the detection network comprises a global dichotomous branch network and a grid classification branch network;
 obtaining a dichotomous result output from the global dichotomous branch network and obtaining a grid classification diagram output from the grid classification branch network based on image classification, wherein the dichotomous result indicates whether a driver is wearing a safety belt, and the grid classification diagram indicates a position information of the safety belt; and
 obtaining a detection result of the safety belt based on the dichotomous result and the grid classification diagram, wherein the detection result indicates whether the driver is wearing the safety belt normatively.

2. The safety belt detection method of claim 1, wherein after obtaining an original image through a camera, the safety belt detection method further comprises:
   detecting a human hand in the original image based on a human hand detection algorithm to obtain a human hand bounding box;
   obtaining a safety belt bounding box in the original image based on a position and a size of the face bounding box; and
   not cropping the image and determining that the detection result is that the safety belt is covered when the hand bounding box is located at a predetermined position relative to the face bounding box and an overlapping area of the hand bounding box and the safety belt bounding box is greater than a set threshold.

3. The safety belt detection method of claim 1, wherein the step of obtaining a grid classification diagram output from the grid classification branch network based on image classification further comprises:
   dividing the image to be detected into a plurality of grids in row and column directions;
   judging whether the image in each grid of the row or column corresponds to a safety belt area row by row or column by column; marking the grid in which the image corresponds to the safety belt area as a safety belt grid; and
   obtaining the grid classification diagram in which the safety belt grid is marked.

4. The safety belt detection method of claim 1, wherein the detection network further comprises a backbone network; and
   before obtaining a dichotomous result output from the global dichotomous branch network and obtaining a grid classification diagram output from the grid classification branch network based on image classification, the method further comprises:
   obtaining a convolution of the image to be detected by the backbone network to generate a feature map of the image to be detected, and using the feature map as an input of the global dichotomous branch network and the grid classification branch network.

5. The safety belt detection method of claim 3, wherein the step of obtaining a detection result of the safety belt based on the dichotomous result and the grid classification diagram further comprises:
   obtaining coordinates of the safety belt grids in the grid classification diagram;
   fitting a centerline of the safety belt in the grid classification diagram based on the coordinates;
   calculating parameters related to the centerline; and
   obtaining the detection result of the safety belt based on the parameters and the dichotomous result.

6. The method of claim 5, wherein the parameters related to the centerline further comprise: an included angle between the centerline and a predetermined direction, and a relative position between the centerline and the driver's shoulder.

7. The method of claim 1, wherein before obtaining the image to be detected, the method further comprises:
   selecting training images, and
   training the global dichotomous branch network and the grid classification branch network with an aid of an image segmentation branch network based on the training images;
   wherein the image segmentation branch network outputs segmentation images based on the training images, the segmentation images are reduced by a predetermined proportion relative to the training images, and pixel positions of the segmentation images are mapped corresponding to pixel positions of the image to be detected.

8. A safety belt detection apparatus, comprising:
   an image obtaining unit, configured to obtain an image to be detected;
   an image detection unit, configured to input the image to be detected into a detection network, wherein the detection network comprises a global dichotomous branch network and a grid classification branch network; obtaining a dichotomous result output from the global dichotomous branch network and obtaining a grid classification diagram output from the grid classification branch network based on image classification, wherein the dichotomous result indicates whether a driver wears a safety belt, and the grid classification diagram indicates a position information of the safety belt; and
   a result obtaining unit, configured to obtain a detection result of the safety belt based on the dichotomous result and the grid classification diagram, wherein the detection result indicates whether the driver wears the safety belt normatively.

9. The safety belt detection apparatus of claim 8, wherein the image obtaining unit further comprises:
   an image capture unit, configured to capture an original image by a camera;
   an image cropping unit configured to:
   detect a face in the original image based on a face detection algorithm to obtain a face bounding box and a head posture information;
   determine whether a part below the face in the original image meets a predetermined size;
   determine a detection result as insufficient detection area if the predetermined size is not met; or dynamically crop the part below the face in the original image based on the face bounding box and the head posture information to obtain a cropped image if the predetermined size is met; and
   an image pre-processing unit, configured to pre-process the cropped image to obtain the image to be detected.

10. The safety belt detection apparatus of claim 9, wherein the image cropping unit is further configured to:
    detect a human hand in the original image based on a human hand detection algorithm to obtain a human hand bounding box;
    obtain a safety belt bounding box in the original image based on a position and a size of the face bounding box; and
    not crop the image and determine that the detection result is that the safety belt is covered when the hand bounding box is located at a predetermined position relative to the face bounding box and an overlapping area of the hand bounding box and the safety belt bounding box is greater than a set threshold.

11. The safety belt detection apparatus of claim 8, wherein the image detection unit comprises a grid classification branch network detection unit configured to: divide the image to be detected into a plurality of grids in row and column directions; judge whether the image in each grid of the row or column corresponds to a safety belt area row by row or column by column; mark the grid in which the image corresponds to the safety belt area as a safety belt grid; and obtain the grid classification diagram in which the safety belt grid is marked.

12. The safety belt detection apparatus of claim 8, wherein the detection network further comprises a backbone network; and
the image detection unit further comprises:
a feature extraction unit, configured to obtain a convolution of the image to be detected by the backbone network to generate a feature map of the image to be detected, and
use the feature map as an input of the global dichotomous branch network and the grid classification branch network.

13. The safety belt detection apparatus of claim 8, wherein the result obtaining unit comprises:
a centerline calculation unit, configured to obtain coordinates of the safety belt grids in the grid classification diagram;
fit a centerline of the safety belt in the grid classification diagram based on the coordinates; and
calculate parameters related to the centerline;
the result obtaining unit is further configured to obtain the detection result of the safety belt based on the parameters and the dichotomous result.

14. The safety belt detection apparatus of claim 13, wherein the parameters related to the centerline comprise: an included angle between the centerline and a predetermined direction, and a relative position between the centerline and the driver's shoulder.

15. The safety belt detection apparatus of claim 8, further comprising a detection network training unit, configured to:
select training images, and
train the global dichotomous branch network and the grid classification branch network with an aid of an image segmentation branch network based on the training images;
wherein the image segmentation branch network outputs segmentation images based on the training images, the segmentation images are reduced by a predetermined proportion relative to the training images, and pixel positions of the segmentation images are mapped corresponding to pixel positions of the image to be detected.

* * * * *